United States Patent [19]

Kobayashi

[11] Patent Number: 5,109,753

[45] Date of Patent: May 5, 1992

[54] POWER STEERING VALVE ASSEMBLY MECHANISM WITH OFFSET VALVE SLEEVE BORE

[75] Inventor: Shigeki Kobayashi, Aichi, Japan

[73] Assignee: TRW Steering & Industrial Products (Japan) Co., Ltd., Tokyo, Japan

[21] Appl. No.: 650,073

[22] Filed: Feb. 4, 1991

[30] Foreign Application Priority Data

Mar. 20, 1990 [JP] Japan ............................ 2-28987[U]

[51] Int. Cl.⁵ ............................................. F15B 9/10
[52] U.S. Cl. .............................. 91/375 A; 137/625.23; 74/388 PS
[58] Field of Search ................. 91/375 A; 74/388 PS; 137/625.23, 625.24

[56] References Cited

U.S. PATENT DOCUMENTS

| | | | |
|---|---|---|---|
| 3,295,624 | 1/1967 | Lee et al. | 74/390 X |
| 3,470,758 | 10/1969 | Liebert | 74/388 PS |
| 3,700,004 | 10/1972 | Tobias | 137/625.23 |
| 4,128,046 | 12/1978 | Rosell | 91/375 A |
| 4,544,131 | 10/1985 | Adams | 91/375 A X |
| 4,699,174 | 10/1987 | Bishop | 91/375 A X |
| 4,823,839 | 4/1989 | Rayner | 91/375 A X |

FOREIGN PATENT DOCUMENTS 0077710 6/1982 European Pat. Off. .

Primary Examiner—Edward K. Look
Assistant Examiner—John Ryznic
Attorney, Agent, or Firm—Tarolli, Sundheim & Covell

[57] ABSTRACT

In a valve assembly of a power steering device, the center line of a cylindrical bore of a valve sleeve intersects the center line of a radially extending pin hole in the valve sleeve and is displaced from the center line of the valve assembly toward the side of the sleeve opposite to the pin hole. The valve sleeve is thicker at its periphery adjacent to the pin hole, thereby increasing the engagement length of a drive pin with the pin hole. Consequently, the pressure-receiving area of the pin hole is increased, and the unit area engagement force of the valve sleeve is thus reduced. The bending moment on the drive pin is also reduced, which adds to the durability of the drive pin. Since a bearing stress is thus reduced, a driver never feels unexpected reaction, due to wear, applied to a steering wheel while the driver is manually turning the steering wheel.

5 Claims, 4 Drawing Sheets

FIG. 5
RELATED ART
FIG. 6
RELATED ART
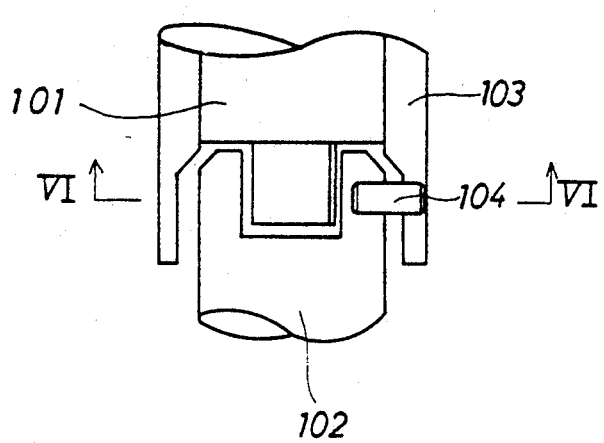
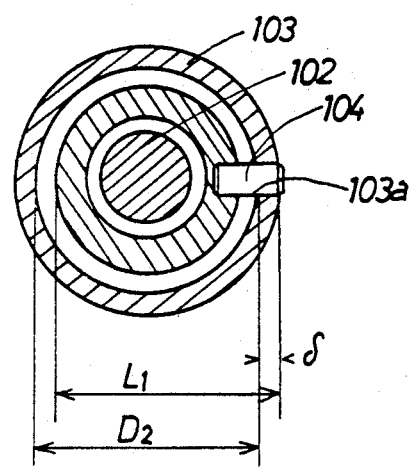
FIG. 7
RELATED ART
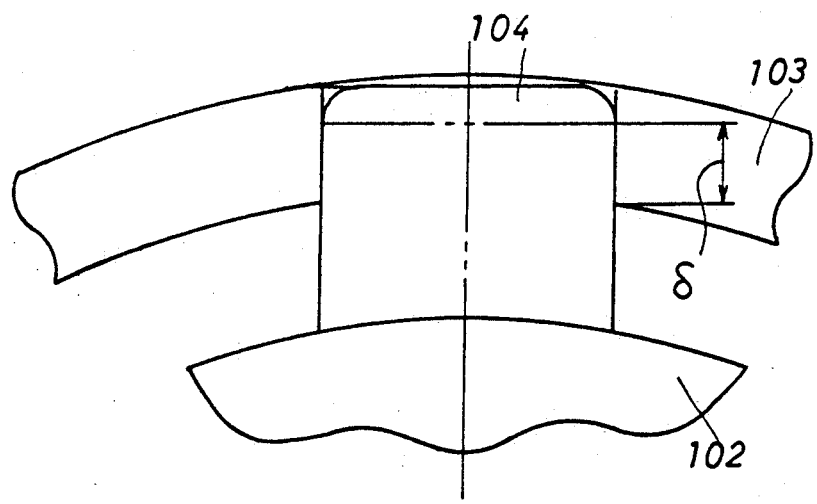

5,109,753

POWER STEERING VALVE ASSEMBLY MECHANISM WITH OFFSET VALVE SLEEVE BORE

BACKGROUND OF THE INVENTION:

This invention relates to a valve assembly mechanism for a power steering device.

As used herein center line shall, where applicable, be construed as being an axis.

The valve assembly in the power steering device of rack and pinion type shown in FIGS. 5 through 7 is known in the art. An input shaft 101 is connected to a steering shaft (not shown), and a pinion shaft 102 is connected to a rack (not shown) for turning vehicle steering wheels. A valve sleeve 103 is positioned on the outer periphery of the input shaft 101. The input shaft 101 is connected via a torsion bar (not shown) to the pinion shaft 102, so that the input shaft 101 and the pinion shaft 102 can relatively rotate by a defined small amount. A drive pin 104 is inserted into the outer periphery of the pinion shaft 102 along a radius thereof. When the input shaft 101 and the pinion shaft 102 are assembled, a pin hole 103a provided along the radius of the valve sleeve 103 receives the drive pin 104. The drive force for turning the vehicle steering wheels is transmitted through the steering shaft to the input shaft 101. When the input shaft 101 rotates relative to the valve sleeve 103, hydraulic liquid is forced from a hydraulic power source (not shown) through holes (not shown) in the valve sleeve 103 into a hydraulic cylinder (not shown). The piston of the hydraulic cylinder moves the rack, thereby rotating the pinion shaft 102 and the valve sleeve 103. A relative rotation angle is formed between the input shaft 101 and the pinion shaft 102 according to external forces such as the thrust of the rack. The relative rotation angle is small as described above. Hydraulic liquid is forced through the holes in the valve sleeve 103 when the relative rotation angle is present.

When the valve assembly is assembled, the drive pin 104 in the pinion shaft 102 is inserted into the pin hole 103a of the valve sleeve 103. Specifically, when the input shaft 101 is inserted into the pinion shaft 102, the drive pin 104 is set in the pin hole 103a. When the drive pin 104 engages the pin hole 103a of the valve sleeve 103, dimension L1 is obtained as shown in FIG. 6. To allow assembly the inner diameter $D_2$ of the valve sleeve 103 is larger than the dimension $L_1$. Engagement extent δ is thus limited. As a result, durability of the drive pin 104 is marginal. Wear on the drive pin 104 resulting from normal use causes hydraulic pressure reaction on an automotive steering wheel. To increase the durability and strength, the dimension of the drive pin 104 and associated components can be enlarged so that the area for receiving pressure is increased. However, this makes the valve assembly large-sized.

SUMMARY OF THE INVENTION

Wherefore, an object of this invention is to provide a power steering valve assembly mechanism having engagement dimension sufficiently large to ensure bearing strength without a largesized valve assembly resulting.

Other objects and benefits of the invention will become apparent from the detailed description which follows hereinafter when taken in conjunction with the drawing figures which accompany it.

To solve this and other objects, this invention provides a valve assembly in a power steering device. The power steering device comprises an input shaft connected to a steering shaft, a pinion shaft connected at one end to the input shaft for relative rotation and at the other end to a rack for turning vehicle steering wheels, a valve sleeve positioned on an outer periphery of the input shaft, and a torsion bar for connecting the input shaft and the pinion shaft. By inserting a drive pin projecting perpendicularly from an outer periphery of the pinion shaft into a pin hole provided along a radius of the valve sleeve, the pinion shaft is connected to the valve sleeve. The center line of the inner diameter of the valve sleeve intersects the center line of the pin hole and is deviated from the center line of the valve assembly toward the side of the valve assembly opposite to the pin hole.

BRIEF DESCRIPTION OF THE DRAWINGS

The invention will now be described, by way of example, with reference to the accompanying drawings, in which:

FIG. 5 is a front view of a pinion shaft and a valve sleeve connected by a drive pin in the related art;

FIG. 6 is a cross-section of FIG. 5 on section line VI—VI.

FIG. 7 is an enlarged diagrammatic sectional view of the main portion of the pinion shaft and the valve sleeve in FIG. 5.

DETAILED DESCRIPTION OF THE PREFERRED EMBODIMENT

Figure 1:
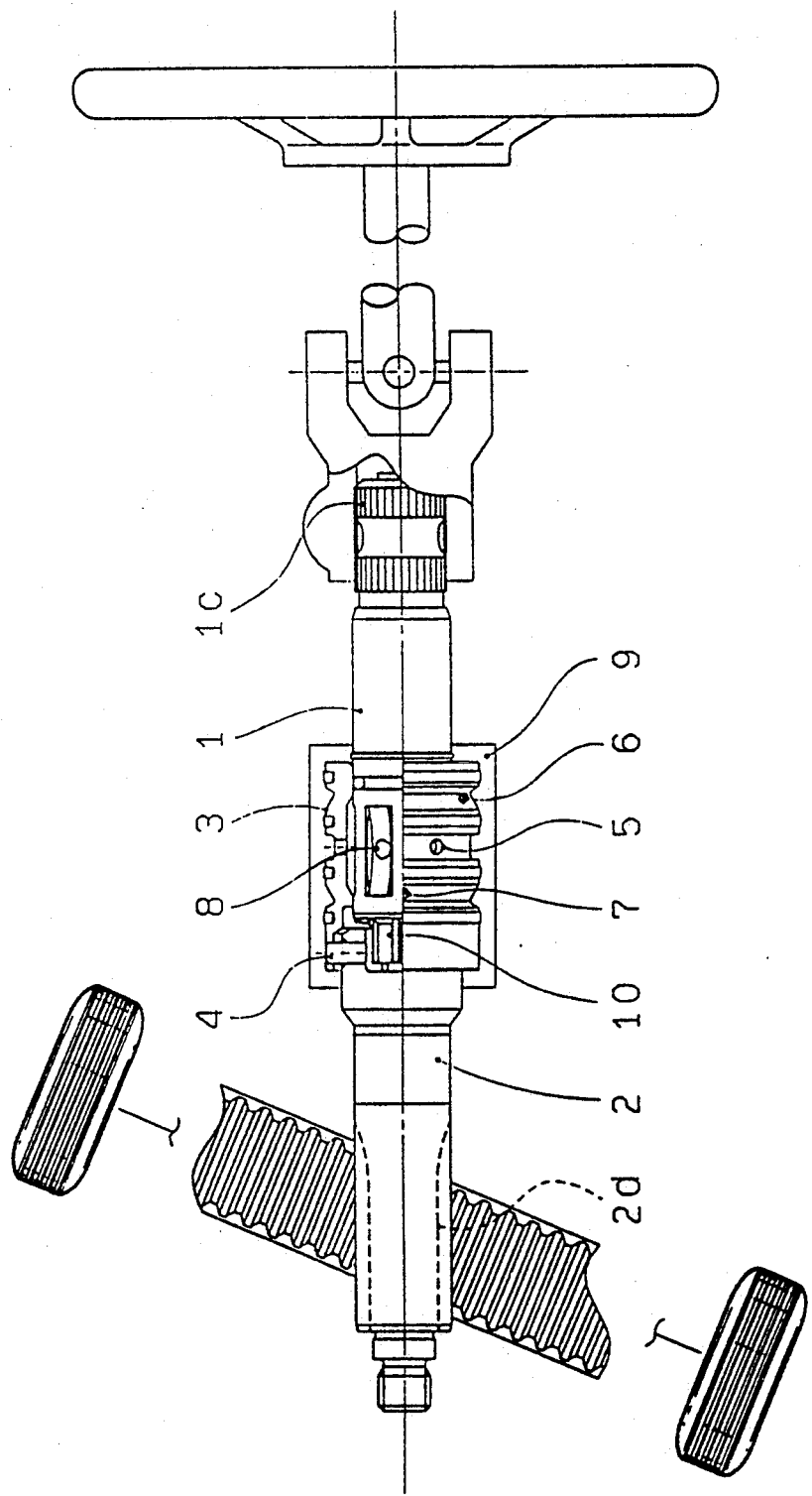
FIG. 1 is a partial side view of a valve assembly of a power steering device embodying the invention.
Figure 2:
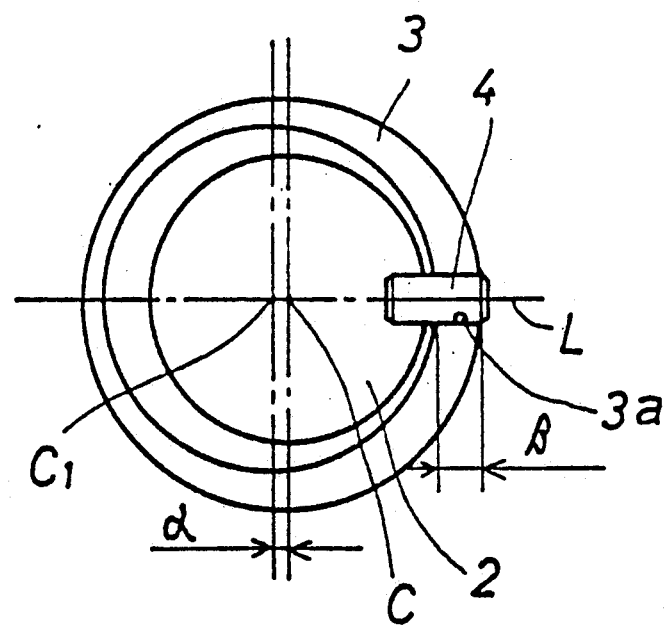
FIG. 2 is a diagrammatic sectional view of a pinion shaft connected with a valve sleeve.

In FIG. 1 an input shaft 1, a pinion shaft 2, and a valve sleeve 3 of a control valve 9 are assembled with the input and pinion shafts coaxially connected for rotation together via a torsion bar 10. The right end of the input shaft 1 is connected via a gear 1c to a steering shaft (not shown) as the figure is viewed. The left end of the pinion shaft 2 is provided with a pinion 2d as the figure is viewed. The pinion 2d meshes with a rack shaft (now shown) for receiving or transmitting steering motion. As best seen in FIG. 2, a drive pin 4 is forced with an interference fit into a bore extending along a radius of the pinion shaft 2. When the input shaft 1 and the pinion shaft 2 are assembled, pin hole 3a extending from a cylindrical bore of the valve sleeve 3, along a radius thereof, receives the drive pin 4. The center line $C_1$ of the cylindrical bore, of the valve sleeve 3, intersects the axial center line of the pin hole 3a and is displaced, by eccentricity α toward the side of the valve assembly opposite to the pin hole 3a from the center line C of a valve assembly on a diameter L of the valve sleeve 3 passing through the center line C. Since the bore of the valve sleeve 3 is thus eccentric relative to the pinion shaft 2, the valve sleeve 3 is thicker at the portion around the pin hole 3a, without increasing the size of the valve sleeve 3, as compared with the engagement extent δ of the drive pin 104 and the pin hole 103a in the related art. The drive pin 4 of this invention therefore has a larger engagement dimension $\beta$, which consists of the engagement extent $\delta$ plus the eccentricity $\alpha$. Holes 5 thru 8 are provided in the valve sleeve 3 and the input shaft 1. A hydraulic power source (not shown) is associated via the holes 5 thru 8 with a hydraulic cylinder (not shown). When the steering shaft rotates and the valve sleeve 3 rotates relative to the input shaft 1, hydraulic liquid is forced from the hydraulic power source through the holes 5 thru 8 into the hydraulic cylinder. The piston of the hydraulic cylinder moves a rack axially, thereby rotating the pinion shaft 2. A relative rotation angle dependent on the torsional resilience of the torsion bar 10 is formed between the pinion shaft 2 and the input shaft 1 corresponding to external force such as the thrust of the rack.

Figure 3:
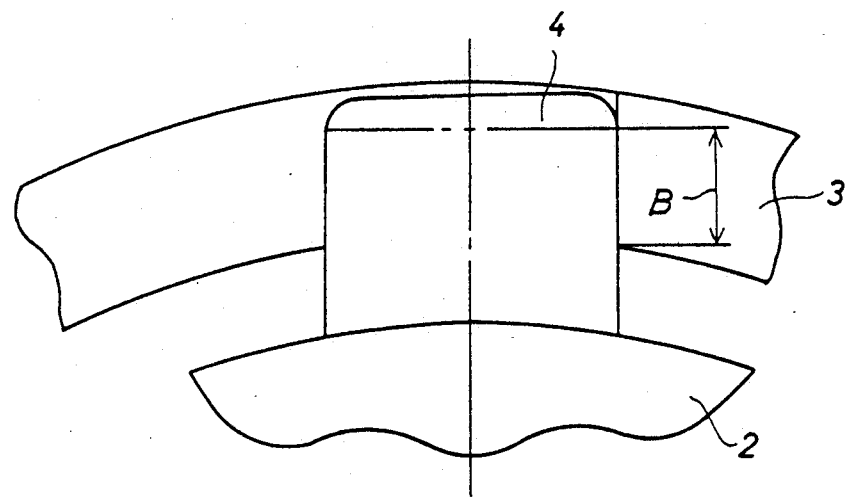
FIG. 3 is an enlarged diagrammatic sectional view showing the eccentricity of the center of the inner diameter of the pinion shaft.
Figure 4:
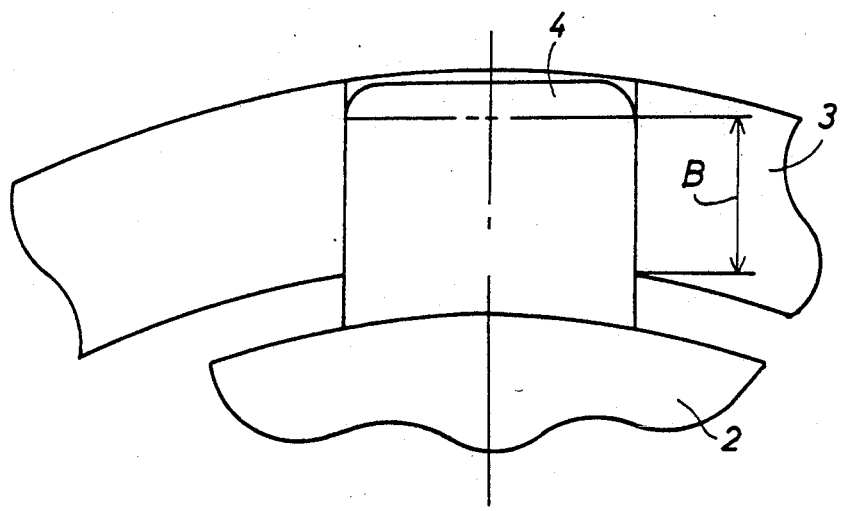
FIG. 4 is an enlarged diagrammatic sectional view showing the eccentricity larger than that shown in FIG. 3.

As shown in FIG. 7, the engagement extent $\delta$ of the drive pin 104 in the related art is 1.06 mm. In the present invention, the engagement dimension $\beta$ of the drive pin 4 is 1.56 mm, as shown in FIG. 3, when the eccentricity $\alpha$ is 0.5 mm, and is 2.06 mm, as shown in FIG. 4, when the eccentricity $\alpha$ is 1.0 mm.

As aforementioned, since the engagement dimension $\beta$ of the drive pin 4 with the pin hole 3a of the valve sleeve 3 is increased by the eccentricity $\alpha$, the pin hole 3a for receiving the drive pin 4 has a pressure-receiving area larger by 2r $\alpha$ than that of the pin hole 103a in the related art, in which r denotes the radius of the pin hole. Specifically, since the pin hole 3a in the valve sleeve 3 is lengthened, the engagement force of the drive pin 4 and the valve sleeve 3 is thus increased without changing other dimensions of the valve assembly to increase its size. More specifically the pin diameter, pin hole diameter, pinion and input shaft diameters, and valve sleeve size need not be increased relative to the related art. As compared with the related art, the center line C of the valve assembly as a support point is closer to the engagement between the drive pin 4 and the pin hole 3a. Consequently, the bending moment exerted on the drive pin 4 is reduced, thereby resulting in greater durability of the drive pin 4.

This invention has been described above with reference to a preferred embodiment as shown in the drawings. Modifications and alterations may become apparent to one skilled in the art upon reading and understanding the specification. Despite the use of a single embodiment for illustration purposes, however, it is intended to include all such modifications and alterations within the scope and spirit of the appended claims.

Wherefore, having thus described the present invention, what is claimed is:

1. A power steering device including a valve assembly mechanism defining an assembly center line and comprising:
    an input shaft for connection to a steering shaft;
    a pinion shaft relatively rotatably connected to the input shaft and having a pinion engagable with a rack for turning vehicle steering wheels;
    a valve sleeve surrounding an outer periphery of the input shaft; and
    a torsion bar connecting the input shaft and the pinion shaft; wherein,
    the pinion shaft is connected to the valve sleeve by a drive pin engaging a pin hole extending from a cylindrical bore of the valve sleeve along a radius of the valve sleeve, the drive pin being engaged with and projecting in a radial direction from the outer periphery of the pinion shaft, and
    the bore of the valve sleeve defines a center line which intersects a center line defined by the pin hole while being displaced from the center line defined by the valve assembly away from the pin hole.

2. A power steering device according to claim 1 wherein the displacement is from about 0.5 mm to about 1.0 mm.

3. A power steering device according to claim 2 wherein the pin contacting length of the pin hole is from about 1.56 mm to about 2.06 mm.

4. A power steering device according to claim 1 wherein the pinion shaft defines a center line coincident with the center line of the valve assembly.

5. A power steering device according to claim 4 wherein the input shaft, output shaft and valve assembly defines a common axis coincident with the assembly center line while being parallel to and displaced from the center line of the bore toward the pin hole.

* * * * *